United States Patent
Alves et al.

(10) Patent No.: US 10,583,923 B2
(45) Date of Patent: Mar. 10, 2020

(54) CONTROL STATION AUDIO AND DATA RECORDING SYSTEMS FOR VEHICLES

(71) Applicant: Honeywell International Inc., Morris Plains, NJ (US)

(72) Inventors: Erin Elizabeth Alves, Peoria, AZ (US); Kiran Gopala Krishna, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 263 days.

(21) Appl. No.: 15/670,450

(22) Filed: Aug. 7, 2017

(65) Prior Publication Data

US 2019/0039729 A1 Feb. 7, 2019

(51) Int. Cl.
| | |
|---|---|
| G06F 7/70 | (2006.01) |
| B64C 39/02 | (2006.01) |
| G07C 5/08 | (2006.01) |
| G08G 5/00 | (2006.01) |
| G07C 5/00 | (2006.01) |

(52) U.S. Cl.
CPC ............ *B64C 39/024* (2013.01); *G07C 5/008* (2013.01); *G07C 5/085* (2013.01); *G08G 5/0013* (2013.01); *G10K 2210/1281* (2013.01)

(58) Field of Classification Search
None
See application file for complete search history.

(56) References Cited

U.S. PATENT DOCUMENTS 5,649,060 A  7/1997 Ellozy et al.
6,092,008 A  7/2000 Bateman
2003/0225492 A1  12/2003 Cope et al.
2018/0050800 A1*  2/2018 Boykin .............. H04N 5/23206

FOREIGN PATENT DOCUMENTS

WO    2016154944    10/2016

OTHER PUBLICATIONS

Atis Uher SA, "Digital Voice Recording and Playback for Air Traffic Control (ATC)", retrived on Jun. 13, 2017 from https://www.airport-suppliers.com/supplier/atis-uher-sa, pp. 1-12, Published in: Switzerland.

* cited by examiner

*Primary Examiner* — Adam M Alharbi
(74) *Attorney, Agent, or Firm* — Fogg & Powers LLC

(57) ABSTRACT

Control station audio and data recording systems are provided. The audio recording system comprises an audio packetizer processing unit in a control station and in operative communication with audio sources. The packetizer processing unit generates audio packet information for vehicles in communication with the control station. An audio storage unit communicates with the packetizer processing unit. The audio storage unit stores audio packet information, and provides audio indexing and metadata. An audio playback unit provides access to the stored audio packet information. The data recording system comprises a data processing unit located a the control station. The data processing unit communicates with onboard vehicle data recorders and with other data sources. The data processing unit generates data packet information for the vehicles. A data storage unit communicates with the data processing unit and stores the data packet information. A data playback unit provides access to the stored data packet information.

19 Claims, 8 Drawing Sheets

CONTROL STATION AUDIO AND DATA RECORDING SYSTEMS FOR VEHICLES

BACKGROUND

Cockpit voice recorders, cockpit data recorders, and flight data recorders, or so-called "black boxes," are of critical importance to the investigation of incidents and accidents in manned aviation. Like manned platforms, unmanned aerial vehicles (UAV) or other unmanned aircraft systems (UAS) are subject to human error as well as mechanical failure, and often a combination of the two occurs.

Accordingly, there is a need for voice and data recorders located on the ground that would support incident and accident investigation by the Federal Aviation Administration (FAA) and National Transportation Safety Board (NTSB) for civilian UAV operations. As UAV operations become increasingly more mainstream, this type of support will be needed to ensure proper regulatory activity.

SUMMARY

Control station audio and data recording systems are provided. The audio recording system comprises an audio packetizer processing unit located in at least one control station, with the audio packetizer processing unit in operative communication with one or more audio sources. The audio packetizer processing unit is configured to generate audio packet information for one or more vehicles in operative communication with the at least one control station. An audio storage unit is in operative communication with the audio packetizer processing unit. The audio storage unit is configured to store the audio packet information for each vehicle, and provide audio indexing and audio metadata. An audio playback unit provides access to the stored audio packet information for each vehicle. The audio packet information is generated from audio information received by the audio packetizer processing unit from the one or more audio sources.

The data recording system comprises a data processing unit located in at least one control station. The data processing unit is in operative communication with a vehicle data recorder onboard each of one or more vehicles, and with one or more other data sources. The data processing unit is configured to generate data packet information for the one or more vehicles. A data storage unit is in operative communication with the data processing unit and is configured to store the data packet information for each vehicle. A data playback unit provides access to the stored data packet information for each vehicle. The data packet information is generated from data received from the vehicle data recorder onboard each vehicle, and data received from the one or more other data sources.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
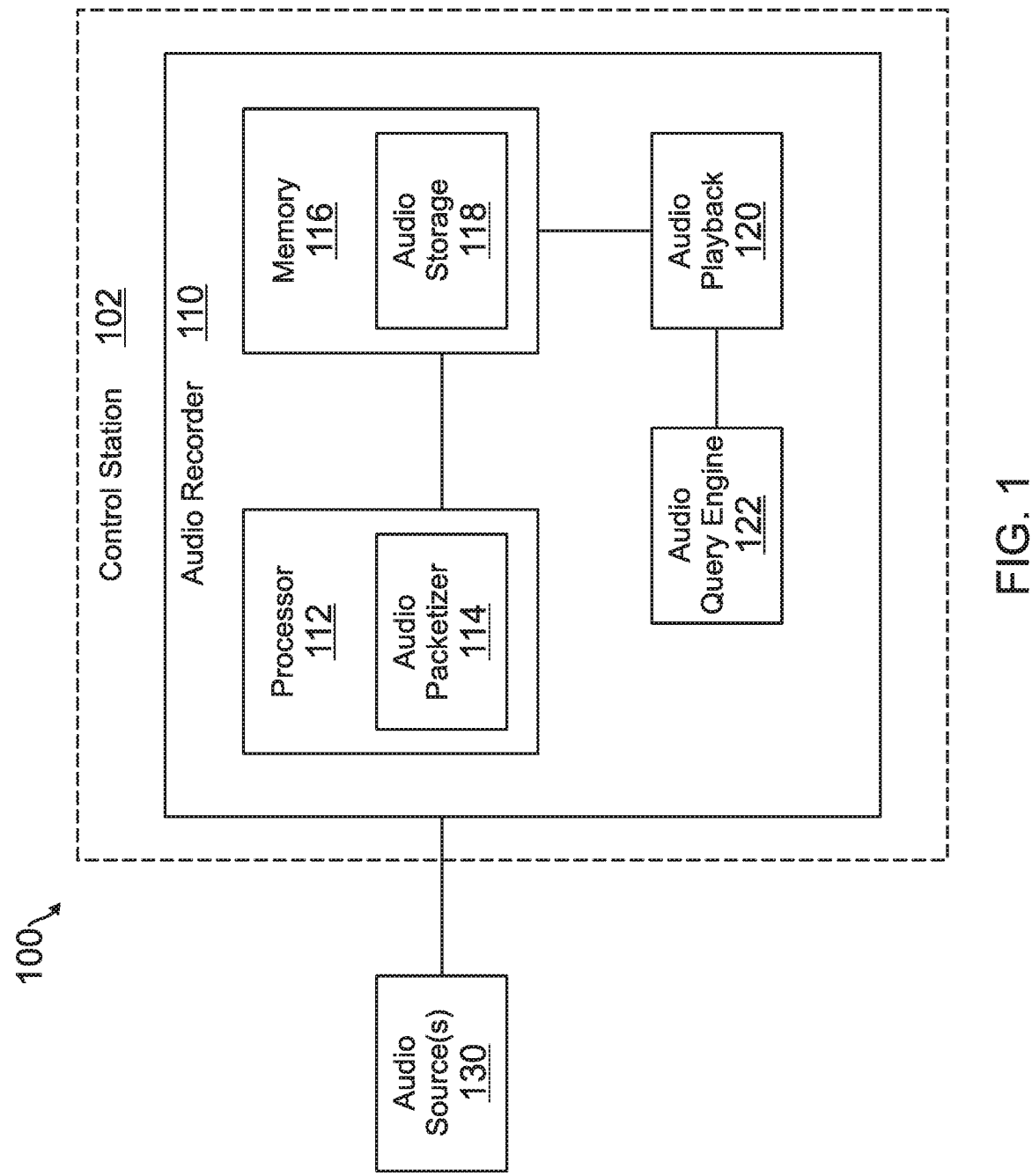
FIG. 1 is a block diagram of a control station audio recording system, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Control station audio and data recording systems and methods for use with various vehicles, such as unmanned or autonomous vehicles, and distributed vehicle operations, are disclosed herein.

In one implementation, a control station audio recording system comprises an audio packetizer processing unit located in at least one control station, with the audio packetizer processing unit in operative communication with one or more audio sources. The audio packetizer processing unit is configured to generate audio packet information for one or more vehicles in operative communication with the control station. The audio packet information is generated from audio information received by the audio packetizer processing unit from the audio sources. An audio storage unit is configured to store the audio packet information for each vehicle, and an audio playback unit provides access to the stored audio packet information.

In another implementation, a control station data recording system comprises a data processing unit located in at least one control station, with the data processing unit in operative communication with a vehicle data recorder onboard each of one or more vehicles, and with one or more other data sources. The data processing unit is configured to generate data packet information for the vehicles. The data packet information is generated from data received from the vehicle data recorder onboard a vehicle, and data received from the other data sources. A data storage unit is configured to store the data packet information for each vehicle, and a data playback unit provides access to the stored data packet information.

In further implementations, the control station audio and data recording systems can be deployed for use in the same control station or in multiple control stations.

The control station audio recording system can capture the audio communications for a complete mission of a vehicle, such as an unmanned aerial vehicle (UAV), which may be handled by multiple operators in multiple geographical locations. The captured audio can be time-stamped and tagged to re-trace the events of the mission.

In addition, audio recording analysis can support vehicle (aircraft) manufacturers in identifying loss of awareness and loss of control issues that may be addressed via design. Also, ground control operations can be aided by understanding communications and hand-off issues that may require further research and system development.

The control station data recording system acts as an extension of the onboard vehicle data recorder, such as a flight data recorder. The data recording system can record and integrate data and visualizations (e.g., camera/sensorial data) available from an operator workstation or a hand-held remote control unit, for example. The captured data can be time-stamped and tagged to re-trace vehicle controls and ground system issues. In addition, the ground data recording system can be used to develop data mining and analytics software.

Data captured by the data recording system can be used with data from onboard flight data recorders, for example, to support aircraft manufacturers in identifying mechanical abnormalities, system faults and failures, and loss of control issues that may be addressed via design.

The ground control station recording system, which includes both audio and data recording, can be used in a thorough replay analysis, for either vehicle performance or vehicle accident investigation. For example, a time-synced replay of the vehicle data recorder, the ground data recording, and the audio recording can be accessed for the analysis.

Further details of various embodiments are described hereafter with reference to the drawings.

FIG. 1 is a block diagram of an audio recording system 100, which can be implemented in at least one control station 102 according to one embodiment. The recording system 100 is configured to provide audio recording functions for one or more vehicles that are in communication with control station 102. Exemplary vehicles include various autonomous vehicles, unmanned aerial vehicles (UAV) or other unmanned aircraft systems, unmanned ground vehicles such as robots, or the like. The recording system 100 generally includes an audio recorder 110 that is in operative communication with one or more audio sources 130.

The audio recorder 110 comprises at least one processor 112 that includes at least one audio packetizer unit 114, which is configured to generate audio packet information for the vehicles in communication with control station 102. The audio packet information is generated from audio data received from audio sources 130, which can include vehicle operator audio input, external audio sources, an event marker source, or the like. The audio packet information can include, for example, vehicle identification, timestamp information, operator identification per channel, audio stream per channel, or the like.

The audio recorder 110 also comprises at least one memory 116, which is configured to provide at least one audio storage unit 118 that is in operative communication with audio packetizer unit 114. The audio storage unit 118 is configured to store the audio packet information, while providing audio indexing and audio metadata. The audio storage unit 118 can be implemented with non-volatile memory, either locally or remotely in cloud storage.

An audio playback unit 120 operatively connected to audio storage unit 118 provides access to the stored audio packet information. The audio playback unit 120 has playback controls that allow time specific and event specific playback of the stored audio information. An audio query engine 122 can also be implemented in audio recorder 210 to provide searching functions for accessing the stored audio information.

Figure 2:
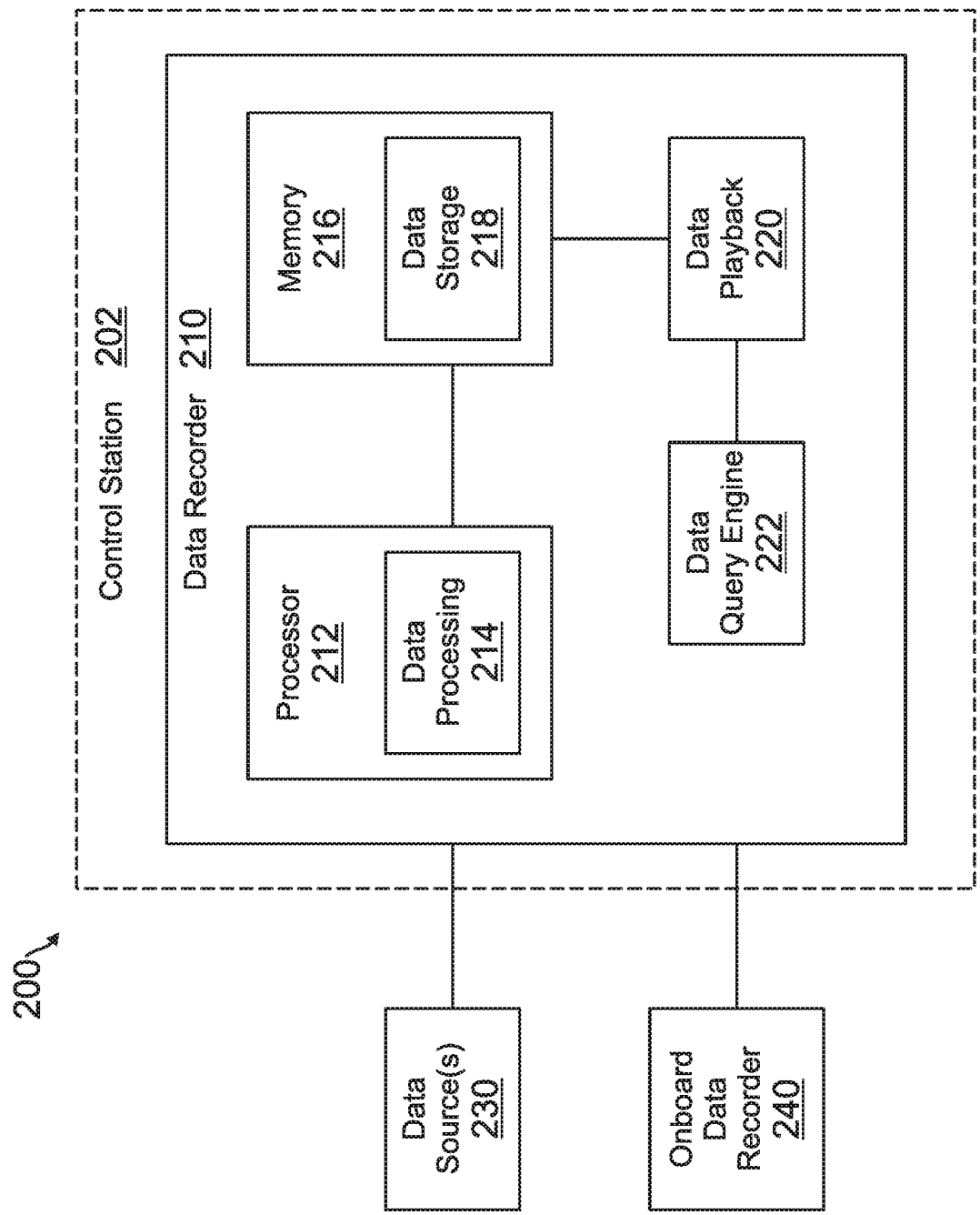
FIG. 2 is a block diagram of a control station data recording system, according to another embodiment.

FIG. 2 is a block diagram of a data recording system 200, which can be implemented in at least one control station 202 according to another embodiment. The recording system 200 is configured to provide data recording functions for one or more vehicles that are in communication with control station 202. Exemplary vehicles include various autonomous vehicles, such as UAVs or other unmanned aircraft systems, ground vehicles such as robots, and the like. The recording system 200 generally includes a control station data recorder 210 that is in operative communication with one or more data sources 230 and an onboard data recorder 240 on each vehicle.

The data recorder 210 comprises at least one processor 212 that includes at least one data processing unit 214, which is configured to generate data packet information for the vehicles in communication with control station 202. The data packet information is generated from data received from data sources 230 and data received from onboard data recorder 240. The data sources 230 can include operator inputs, processed outputs, a mission data source, an external data source (e.g., weather or traffic from Internet sources), a control station equipment heath monitor, an event marker source, or the like. The data packet information can include control station site identification, vehicle identification, mission data, event marker identification, timestamp information, operator data and identification, processed data generated by a workstation with identification, telemetric data from the onboard data recorder, ground equipment health, external data, or the like.

The data recorder 210 also comprises at least one memory 216, which is configured to provide at least one data storage unit 218 that is in operative communication with data processing unit 214. The data storage unit 218 is configured to store the data packet information, while providing data indexing and metadata. The data storage unit 218 can be implemented with non-volatile memory, either locally or remotely in cloud storage.

A data playback unit 220 operatively connected to data storage unit 218 provides access to the stored data packet information. The data playback unit 220 has playback controls that allow time specific and event specific playback of the stored data. A data query engine 222 can also be implemented in data recorder 210 to provide searching functions for accessing the stored data.

In an alternative embodiment, a control station recording system can be implemented that includes both audio recorder 110 and data recorder 210 in the same control station. In other implementations, either or both of audio recorder 110 and data recorder 210 can be employed in multiple control stations.

Figure 3:
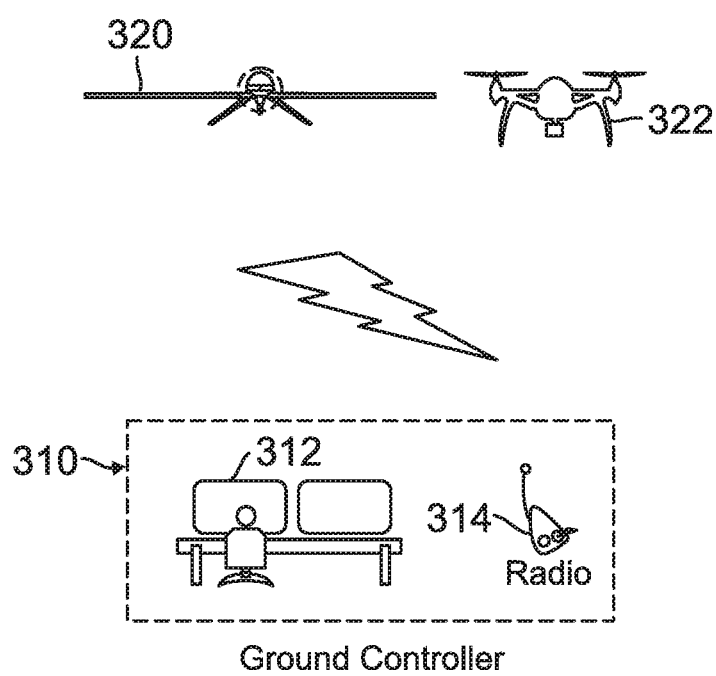
FIG. 3 is a diagrammatic representation of a ground controller station, which includes either or both of an audio recorder and data recorder, for communications with aircraft.

The present audio and data recording systems are particularly suited for use in a ground controller station for inter-operational communication with unmanned vehicles such as a UAV, as well as communication between UAV operators and air traffic control (ATC). FIG. 3 illustrates such a scenario, in which a ground controller 310 includes either or both of the audio recording system and the data recording system. The ground controller 310 can be configured for radio communications with UAVs 320, 322, for example. The audio recording system can integrate a microphone in an operator workstation 312 or a hand-held radio 314, for example.

Figure 4:
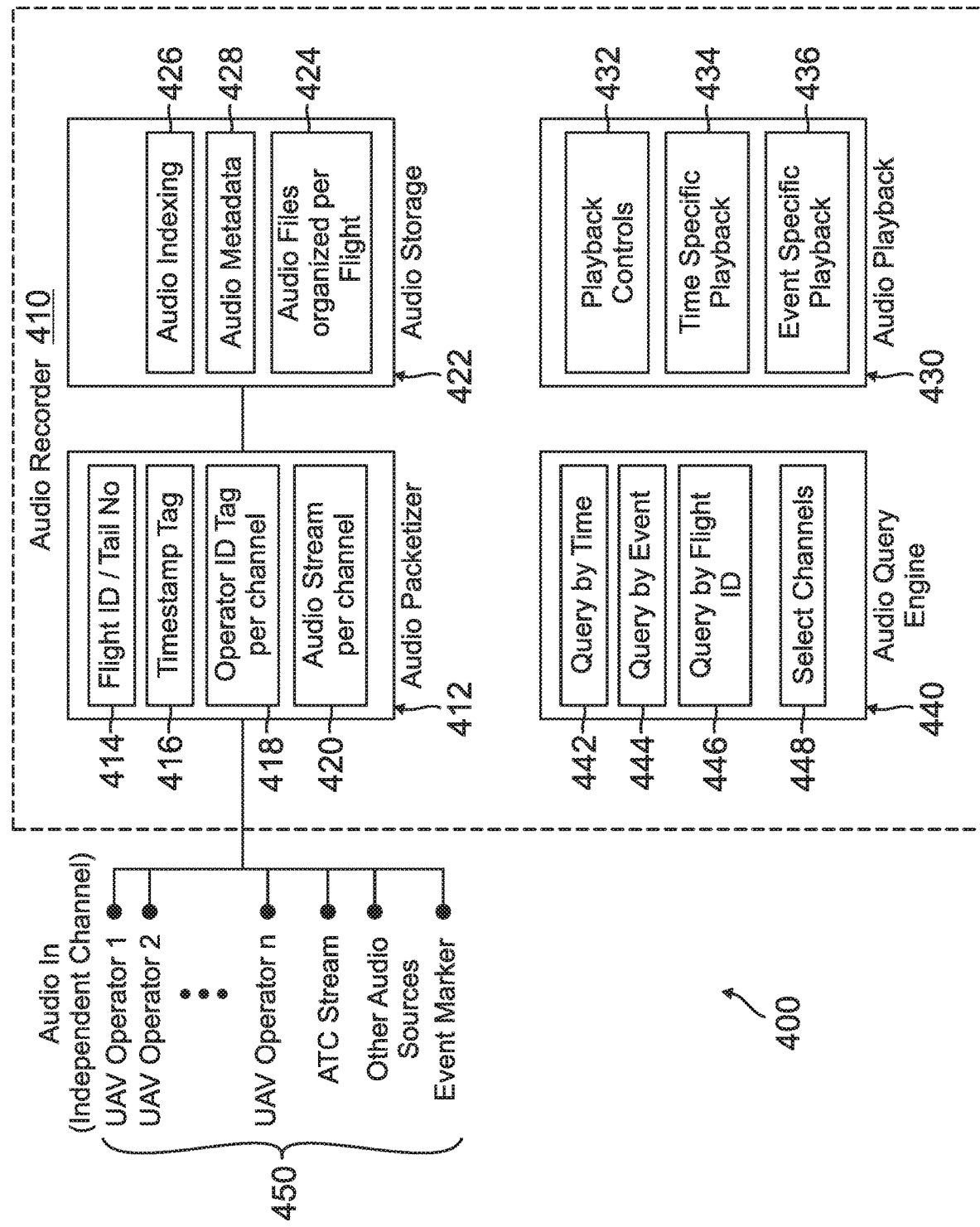
FIG. 4 is a block diagram of a single instance ground controller audio recording system for vehicle communications, according to one implementation.

FIG. 4 is a block diagram of a single instance ground controller audio recording system 400 for vehicle communications, according to one implementation. The audio recording system 400 is configured to provide audio recording functions for multiple vehicles such as UAVs, which are in communication with ground controller 310 (FIG. 3), for example. The audio recording system 400 generally includes an audio recorder 410 that is in operative communication with a plurality of audio sources 450.

The audio recorder 410 comprises an audio packetizer processing unit 412, which is configured to generate audio packet information for the UAVs. The audio packet information is generated from audio data received as audio inputs from audio sources 450 through various independent channels. The audio sources 450 can include, for example, one or more UAV operator audio inputs (e.g, UAV operator 1 . . . UAV operator n), an ATC audio stream, other audio sources, an event marker source, or the like. The audio packet information generated by audio packetizer processing unit 412 can include, for example, flight identification (ID) and/or tail number (414), timestamp tag (416), operator ID tag per channel (418), audio stream per channel (420), or the like.

The audio recorder 410 also comprises an audio storage unit 422 that is in operative communication with audio packetizer processing unit 412. The audio storage unit 422 is configured to store the audio packet information, such as audio files organized per flight (424), while providing audio indexing (426) and audio metadata (428). The audio storage unit 422 can be implemented with non-volatile memory, either locally or in remotely cloud storage.

An audio playback unit 430 operatively connected to audio storage unit 422 provides access to the stored audio packet information. The audio playback unit 430 includes playback controls (432), time specific playback (434), and event specific playback (436). An audio query engine 440 is also implemented in audio recorder 410, and includes various searching functions such as query by time (442), query by event (444), query by flight ID (446), and select channels (448).

Figure 5:
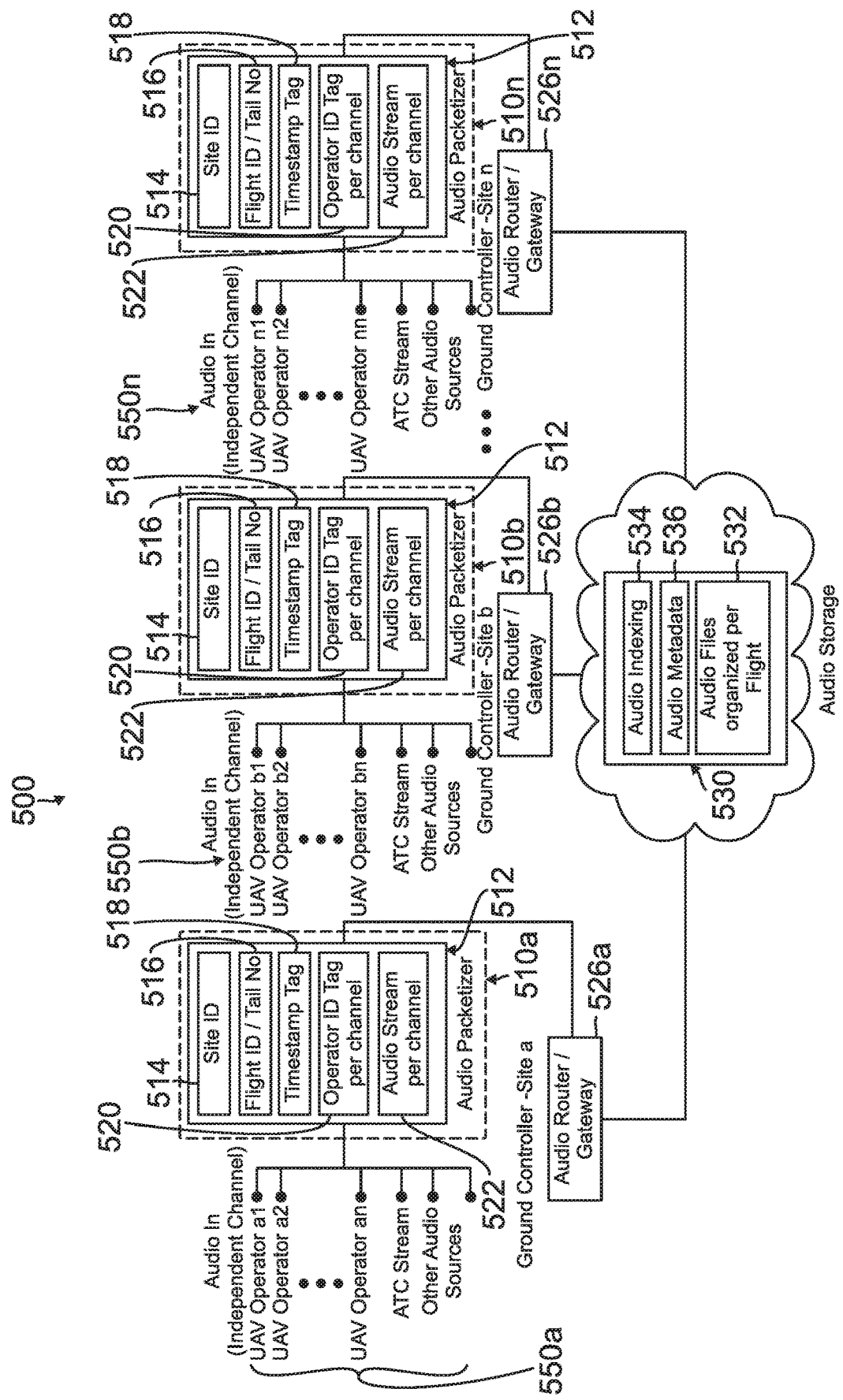
FIG. 5 is a block diagram of a multiple instance ground controller audio recording system for vehicle communications, according to another implementation.

FIG. 5 is a block diagram of a multiple instance ground controller audio recording system 500, according to another implementation. The audio recording system 500 is configured to provide audio recording functions for one or more vehicles such as UAVs, which are in communication with separate ground controllers 510a, 510b, 510n located at different sites (a, b, . . . n) along the course of travel.

Each of ground controllers 510a, 510b, 510n includes an audio packetizer processing unit 512 that is in operative communication with a plurality of audio sources 550a, 550b, 550n. The audio packetizer processing unit 512 in each ground controller is configured to generate audio packet information for the UAVs. The audio packet information is generated from audio data received as audio inputs from the audio sources through various independent channels. The audio sources can include, for example, one or more UAV operator audio inputs, an ATC audio stream, other audio sources, or the like. The audio packet information generated by each audio packetizer processing unit 512 can include, for example, site ID (514), flight ID and/or tail number (516), timestamp tag (518), operator ID tag per channel (520), audio stream per channel (522), or the like.

The audio recording system 500 also comprises a centralized audio storage unit 530 that is in operative communication with each audio packetizer processing unit 512 through a respective audio router or gateway 526a, 526b, . . . 526n. The audio storage unit 530 is configured to store the audio packet information from each audio packetizer processing unit 512, such as audio files organized per flight (532), while providing audio indexing (534) and audio metadata (536). The audio storage unit 530 can be implemented with non-volatile memory in a centralized server or in cloud storage. Audio searching and playback functions can also be provided at each ground controller site to provide access to the stored audio information.

Figure 6:
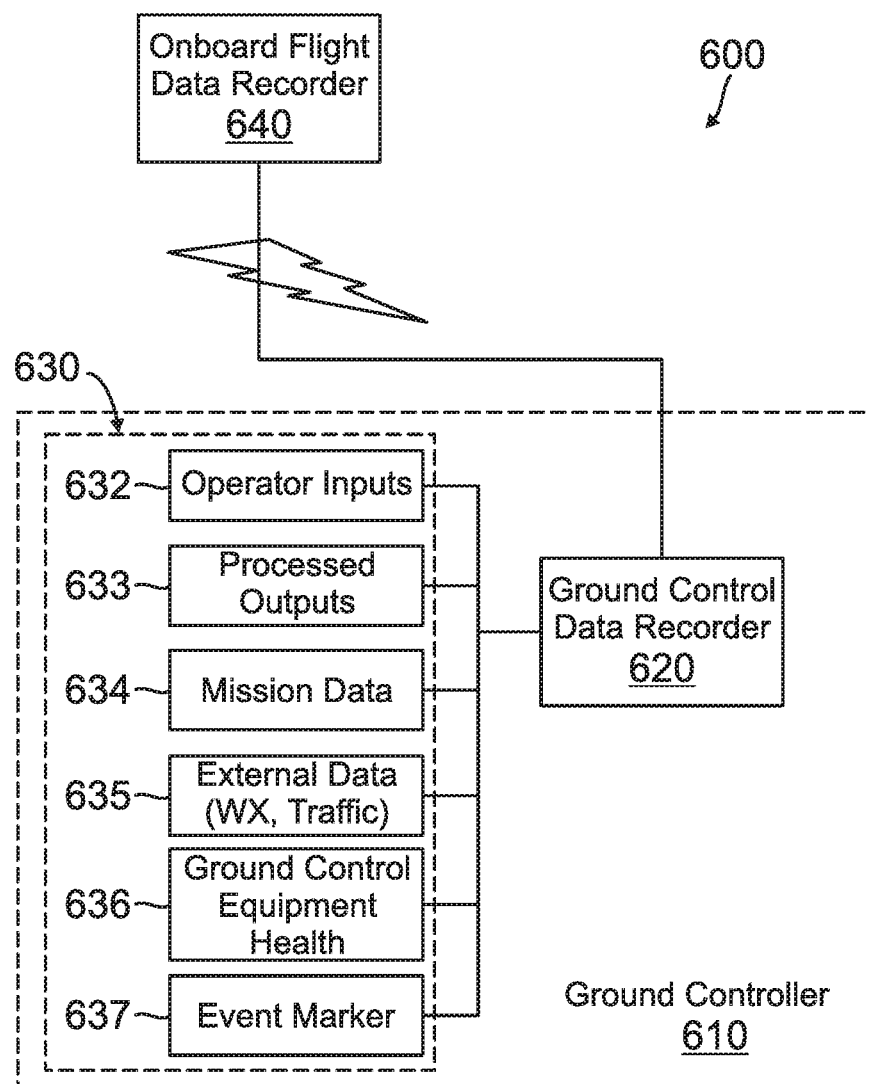
FIG. 6 is a block diagram of a single instance ground controller data recording system for vehicle communications, according to a further implementation.

FIG. 6 is a block diagram of a single instance ground controller data recording system 600, according to a further implementation. The data recording system 600 is configured to provide data recording functions for one or more vehicles such as UAVs, which are in communication with a ground controller 610. The data recording system 600 generally includes a ground control data recorder 620 that is in operative communication with a plurality of data sources 630 and an onboard flight data recorder 640 on each UAV.

The data recorder 620 comprises a data processing unit that is configured to generate data packet information for each UAV in communication with ground controller 610. The data recorder 620 also includes data storage configured to store the data packet information. The data storage can be implemented with non-volatile memory, either locally or in cloud storage. Data searching and playback functions can also be provided by data recorder 620 to provide access to the stored data. The data playback can be indexed using time queries, event queries, or the like.

The data packet information is generated from data received from data sources 630 and data received from onboard flight data recorder 640. The data sources 630 can include, for example, operator inputs (632), processed outputs (633), a mission data source (634), an external data source (635) such as weather (WX) or traffic data sources, ground control equipment heath monitors (636), an event marker source (637), or the like.

Figure 7:
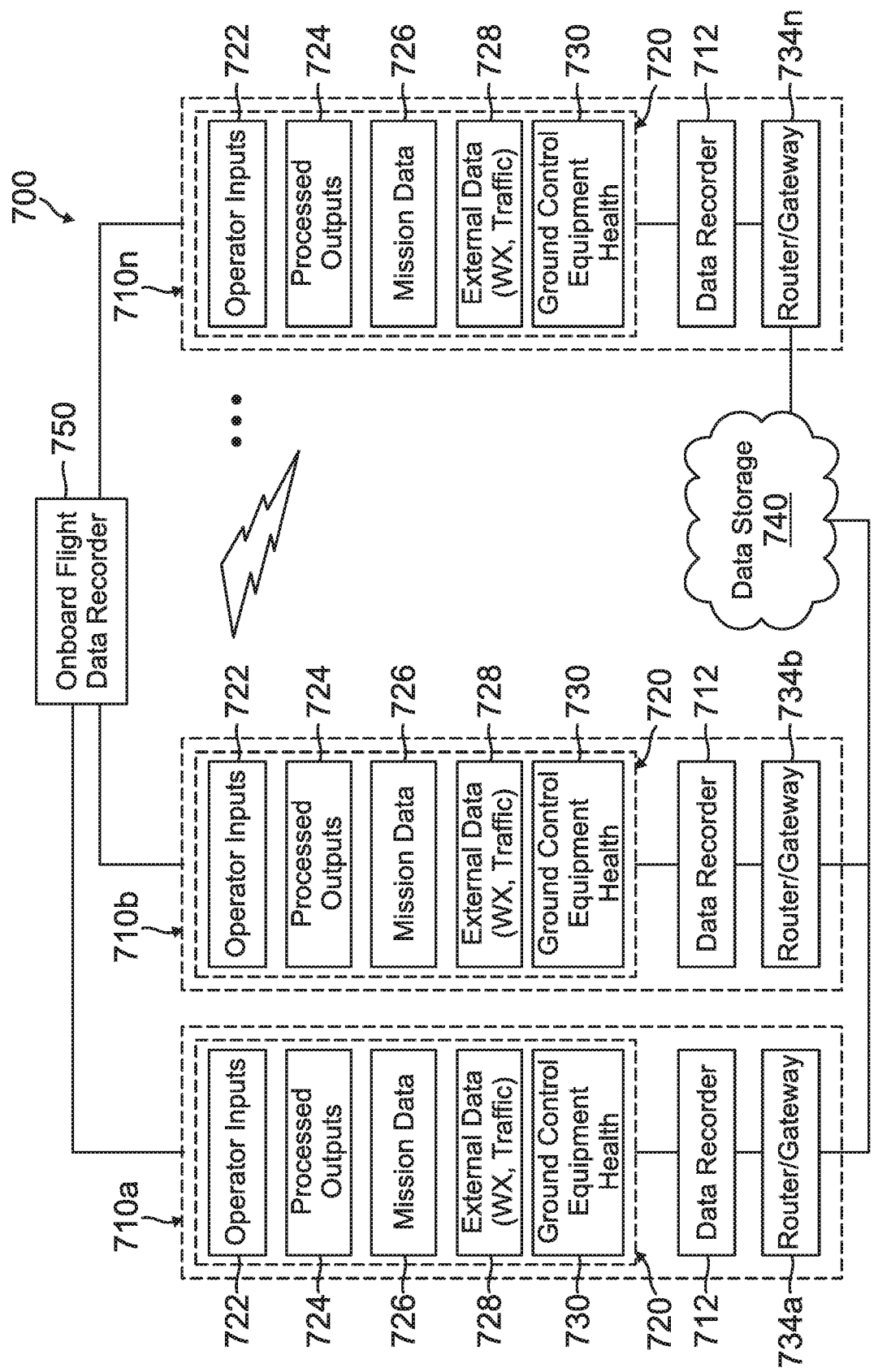
FIG. 7 is a block diagram of a multiple instance ground controller data recording system for vehicle communications, according to another implementation.

FIG. 7 is a block diagram of a multiple instance ground controller data recording system 700, according to another implementation. The data recording system 700 is configured to provide data recording functions for one or ore vehicles such as UAVs, which are in communication with one or more ground controllers 710a, 710b, . . . 710n that are each located at different sites along the course of travel.

Each of ground controllers 710a, 710b, 710n includes a ground control data recorder 712 that is in operative communication with a plurality of data sources 720 and an onboard flight data recorder 750 on each UAV. The ground control data recorder 712 comprises a data processing unit configured to generate data packet information for each UAV in communication with a respective ground controller.

The data packet information is generated from data received from data sources 720 and data received from onboard flight data recorder 750. The data sources 720 can include, for example, operator inputs (722), processed outputs (724), a mission data source (726), an external data source (728) such as weather or traffic data sources, ground control equipment heath monitors (730), or the like.

A centralized data storage unit 740 is in operative communication with each data recorder 712 through a respective data router or gateway 734a, 734b, 734n. The data storage unit 740 is configured to store the data packet information from each data recorder 712. The data storage unit 740 can be implemented with non-volatile memory, either in a centralized server or cloud storage.

Data searching and playback functions can also be provided by each data recorder 712 at each ground controller site to provide access to the stored data. The data playback can be indexed using time queries, event queries, or the like.

Figure 8:
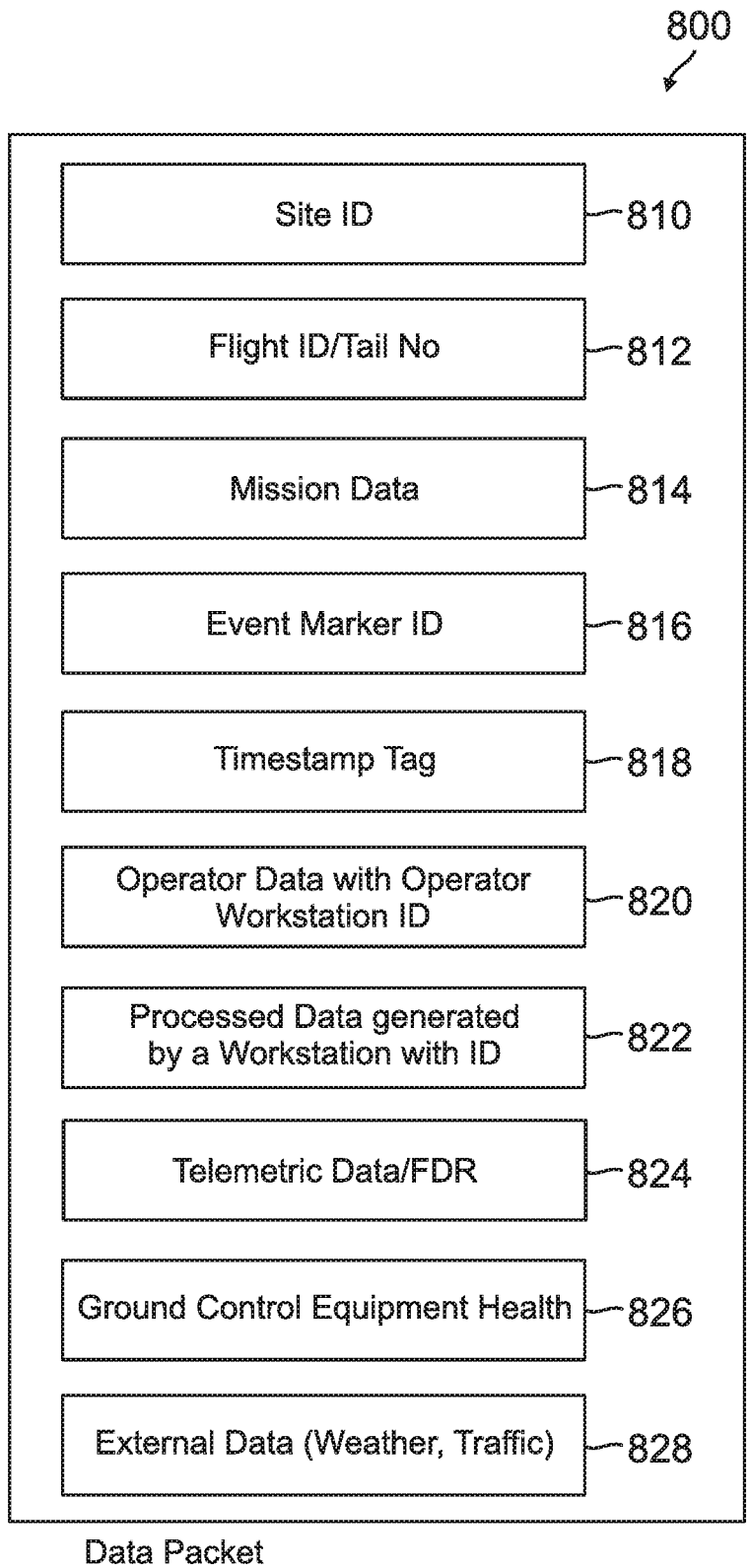
FIG. 8 depicts an exemplary data packet that can be generated from received data information at a ground controller.

FIG. 8 depicts an exemplary data packet 800 that can be generated from the received data information at each of the ground controllers. The data packet 800 can include information such as site ID (810), flight ID and/or tail number (812), mission data (814), event marker ID (816), timestamp tag (818), operator data with operator workstation ID (820), processed data generated by a workstation with ID (822), telemetric data from the flight data recorder (FDR) (824), ground control equipment heath monitors (826), external data sources (828) such as for weather and traffic, or the like.

In an exemplary implementation, an operator in a workstation of a ground controller has access to methods to mark an event (e.g., press an event button). The event is tagged/bookmarked in the ground control data recorder. Various predefined rules may be implemented for event marking as follows: event markers set for time lapse; event markers set after crossing a waypoint; event markers set when exceeding a threshold (e.g., speed, altitude, fuel quantity, etc.); event markers set when a mission step is executed (e.g., payload delivery, image captured, etc.)

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present system and method.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a control station audio recording system comprising: an audio packetizer processing unit located in at least one control station, the audio packetizer processing unit in operative communication with one or more audio sources, the audio packetizer processing unit configured to generate audio packet information for one or more vehicles in operative communication with the at least one control station; an audio storage unit in operative communication with the audio packetizer processing unit, the audio storage unit configured to store the audio packet information for each vehicle, and provide audio indexing and audio metadata; and an audio playback unit that provides access to the stored audio packet information for each vehicle; wherein the audio packet information is generated from audio information received by the audio packetizer processing unit from the one or more audio sources.

Example 2 includes the control station audio recording system of Example 1, wherein the audio packet information comprises at least one of vehicle identification, timestamp information, operator identification per channel, or audio stream per channel.

Example 3 includes the control station audio recording system of any of Examples 1-2, wherein the one or more vehicles comprise an unmanned aerial vehicle (UAV), an unmanned ground vehicle, or an autonomous vehicle.

Example 4 includes the control station audio recording system of any of Examples 1-3, wherein the one or more audio sources comprise an audio input from one or more vehicle operators, an air traffic control (ATC) audio stream, or an event marker source.

Example 5 includes the control station audio recording system of any of Examples 1-4, wherein the audio storage unit is implemented with non-volatile memory locally in the at least one control station.

Example 6 includes the control station audio recording system of any of Examples 1-5, wherein the audio storage unit is implemented with non-volatile memory remotely in cloud storage.

Example 7 includes the control station audio recording system of any of Examples 1-6, wherein the audio playback unit includes playback controls that allow for time specific playback and event specific playback of the stored audio packet information.

Example 8 includes the control station audio recording system of any of Examples 1-7, further comprising an audio query engine that provides search functions for accessing the stored audio packet information, the search functions including query by time, query by event, query by vehicle identification, or select channels.

Example 9 includes the control station audio recording system of any of Examples 1-8, wherein the audio packetizer processing unit is located in each of a plurality of control stations, the audio packetizer processing unit in each respective control station in operative communication with the one or more audio sources; and the audio storage unit is in a centralized location away from each respective control station, the audio storage unit in operative communication each audio packetizer processing unit through an audio router or gateway in each respective control station.

Example 10 includes the control station audio recording system of Example 9, wherein the audio storage unit is implemented with non-volatile memory in a centralized server or in cloud storage.

Example 11 includes a control station data recording system comprising: a data processing unit located in at least one control station, the data processing unit in operative communication with a vehicle data recorder onboard each of one or more vehicles, and with one or more other data sources, wherein the data processing unit is configured to generate data packet information for the one or more vehicles; a data storage unit in operative communication with the data processing unit, the data storage unit configured to store the data packet information for each vehicle; and a data playback unit that provides access to the stored data packet information for each vehicle; wherein the data packet information is generated from data received from the vehicle data recorder onboard each vehicle, and data received from the one or more other data sources.

Example 12 includes the control station data recording system of Example 11, wherein the data packet information comprises at least one of control station site identification, vehicle identification, mission data, event marker identification, timestamp information, operator data and identification, processed data generated by a workstation with identification, telemetric data from a vehicle data recorder, ground equipment health, or external data.

Example 13 includes the control station data recording system of any of Examples 11-12, wherein the one or more vehicles comprise an unmanned aerial vehicle (UAV), an unmanned ground vehicle, or an autonomous vehicle.

Example 14 includes the control station data recording system of any of Examples 11-13, wherein the one or more other data sources comprise an operator input source, a processed output source, a mission data source, an external data source, a control station equipment heath monitor, or an event marker source.

Example 15 includes the control station data recording system of any of Examples 11-14, wherein the data storage unit is implemented with non-volatile memory locally in the control station.

Example 16 includes the control station data recording system of any of Examples 11-15, wherein the data storage unit is implemented with non-volatile memory remotely in cloud storage.

Example 17 includes the control station data recording system of any of Examples 11-16, wherein the data playback unit is configured to index stored data using time queries or event queries.

Example 18 includes the control station data recording system of any of Examples 11-17, wherein the data processing unit is located in each of a plurality of control stations, the data processing unit in each respective control station in operative communication with the vehicle data recorder onboard each vehicle and with the one or more other data sources; and the data storage unit is in a centralized location away from each respective control station, the data storage unit in operative communication each data processing unit through a data router or gateway in each respective control station.

Example 19 includes the control station data recording system of Example 18, wherein the data storage unit is implemented with non-volatile memory in a centralized server or in cloud storage.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A control station audio recording system, comprising:
an audio packetizer processing unit located in at least one ground controller station, the audio packetizer processing unit in operative communication with one or more audio sources, the audio packetizer processing unit configured to generate audio packet information for one or more vehicles in operative communication with the at least one ground controller station;
an audio storage unit in operative communication with the audio packetizer processing unit, the audio storage unit configured to store the audio packet information for each vehicle, and provide audio indexing and audio metadata; and
an audio playback unit, located in the at least one ground controller station, and configured to provide access to the stored audio packet information for each vehicle;
wherein the audio packet information is generated from audio information received by the audio packetizer processing unit from the one or more audio sources.

2. The control station audio recording system of claim 1, wherein the audio packet information comprises at least one of vehicle identification, timestamp information, operator identification per channel, or audio stream per channel.

3. The control station audio recording system of claim 1, wherein the one or more vehicles comprise an unmanned aerial vehicle (UAV), an unmanned ground vehicle, or an autonomous vehicle.

4. The control station audio recording system of claim 3, wherein the one or more audio sources comprise an audio input from one or more vehicle operators, an air traffic control (ATC) audio stream, or an event marker source.

5. The control station audio recording system of claim 1, wherein the audio storage unit is implemented with non-volatile memory locally in the at least one ground controller station.

6. The control station audio recording system of claim 1, wherein the audio storage unit is implemented with non-volatile memory remotely in cloud storage.

7. The control station audio recording system of claim 1, wherein the audio playback unit includes playback controls that allow for time specific playback and event specific playback of the stored audio packet information.

8. The control station audio recording system of claim 1, further comprising an audio query engine that provides search functions for accessing the stored audio packet information, the search functions including query by time, query by event, query by vehicle identification, or select channels.

9. The control station audio recording system of claim 1, wherein:
the audio packetizer processing unit is located in each of a plurality of ground controller stations, the audio packetizer processing unit in each respective ground controller station in operative communication with the one or more audio sources; and
the audio storage unit is in a centralized location away from each respective ground controller station, the audio storage unit in operative communication with each audio packetizer processing unit through an audio router or gateway in each respective ground controller station.

10. The control station audio recording system of claim 9, wherein the audio storage unit is implemented with non-volatile memory in a centralized server or in cloud storage.

11. A control station data recording system, comprising:
a data processing unit located in at least one ground controller station, the data processing unit in operative communication with a vehicle data recorder onboard each of one or more vehicles, and with one or more other data sources, wherein the data processing unit is configured to generate data packet information for the one or more vehicles;
a data storage unit in operative communication with the data processing unit, the data storage unit configured to store the data packet information for each vehicle; and
a data playback unit, located in the at least one ground controller station, and configured to provide access to the stored data packet information for each vehicle;

wherein the data packet information is generated from data received from the vehicle data recorder onboard each vehicle, and data received from the one or more other data sources.

12. The control station data recording system of claim 11, wherein the data packet information comprises at least one of control station site identification, vehicle identification, mission data, event marker identification, timestamp information, operator data and identification, processed data generated by a workstation with identification, telemetric data from a vehicle data recorder, ground equipment health, or external data.

13. The control station data recording system of claim 11, wherein the one or more vehicles comprise an unmanned aerial vehicle (UAV), an unmanned ground vehicle, or an autonomous vehicle.

14. The control station data recording system of claim 11, wherein the one or more other data sources comprise an operator input source, a processed output source, a mission data source, an external data source, a control station equipment heath monitor, or an event marker source.

15. The control station data recording system of claim 11, wherein the data storage unit is implemented with non-volatile memory locally in the at least one ground controller station.

16. The control station data recording system of claim 11, wherein the data storage unit is implemented with non-volatile memory remotely in cloud storage.

17. The control station data recording system of claim 11, wherein the data playback unit is configured to index stored data using time queries or event queries.

18. The control station data recording system of claim 11, wherein:
the data processing unit is located in each of a plurality of ground controller stations, the data processing unit in each respective ground controller station in operative communication with the vehicle data recorder onboard each vehicle and with the one or more other data sources; and
the data storage unit is in a centralized location away from each respective ground controller station, the data storage unit in operative communication with each data processing unit through a data router or gateway in each respective ground controller station.

19. The control station data recording system of claim 18, wherein the data storage unit is implemented with non-volatile memory in a centralized server or in cloud storage.

* * * * *